Figure 1:
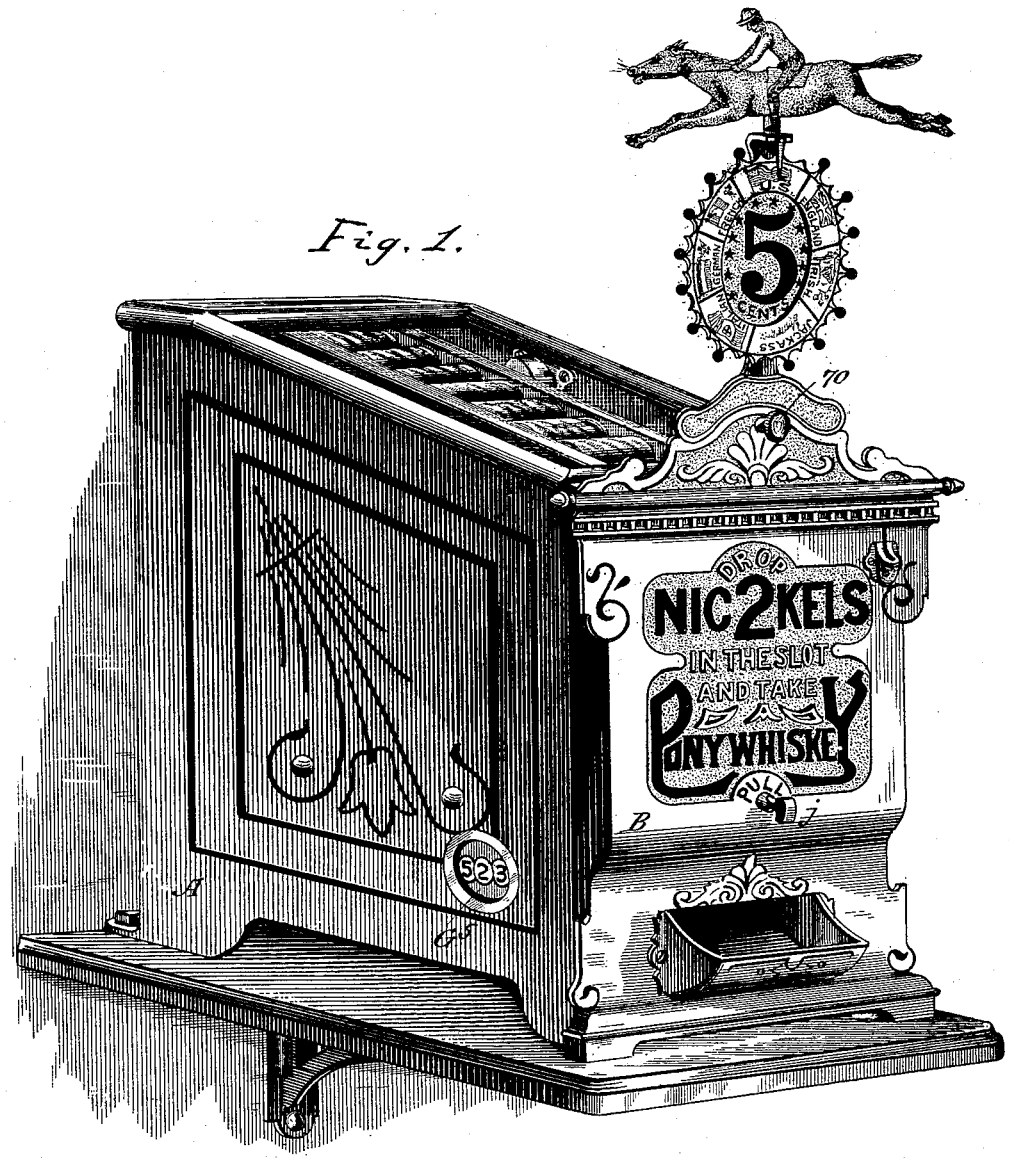

(No Model.) 4 Sheets—Sheet 1.

F. G. DIETERICH.
VENDING MACHINE.

No. 452,635. Patented May 19, 1891.

Witnesses
M. D. Cloudel
Jos. A. Ryan

Inventor
Fred G. Dieterich (No Model.)  4 Sheets—Sheet 2.
F. G. DIETERICH.
VENDING MACHINE.
No. 452,635.  Patented May 19, 1891.
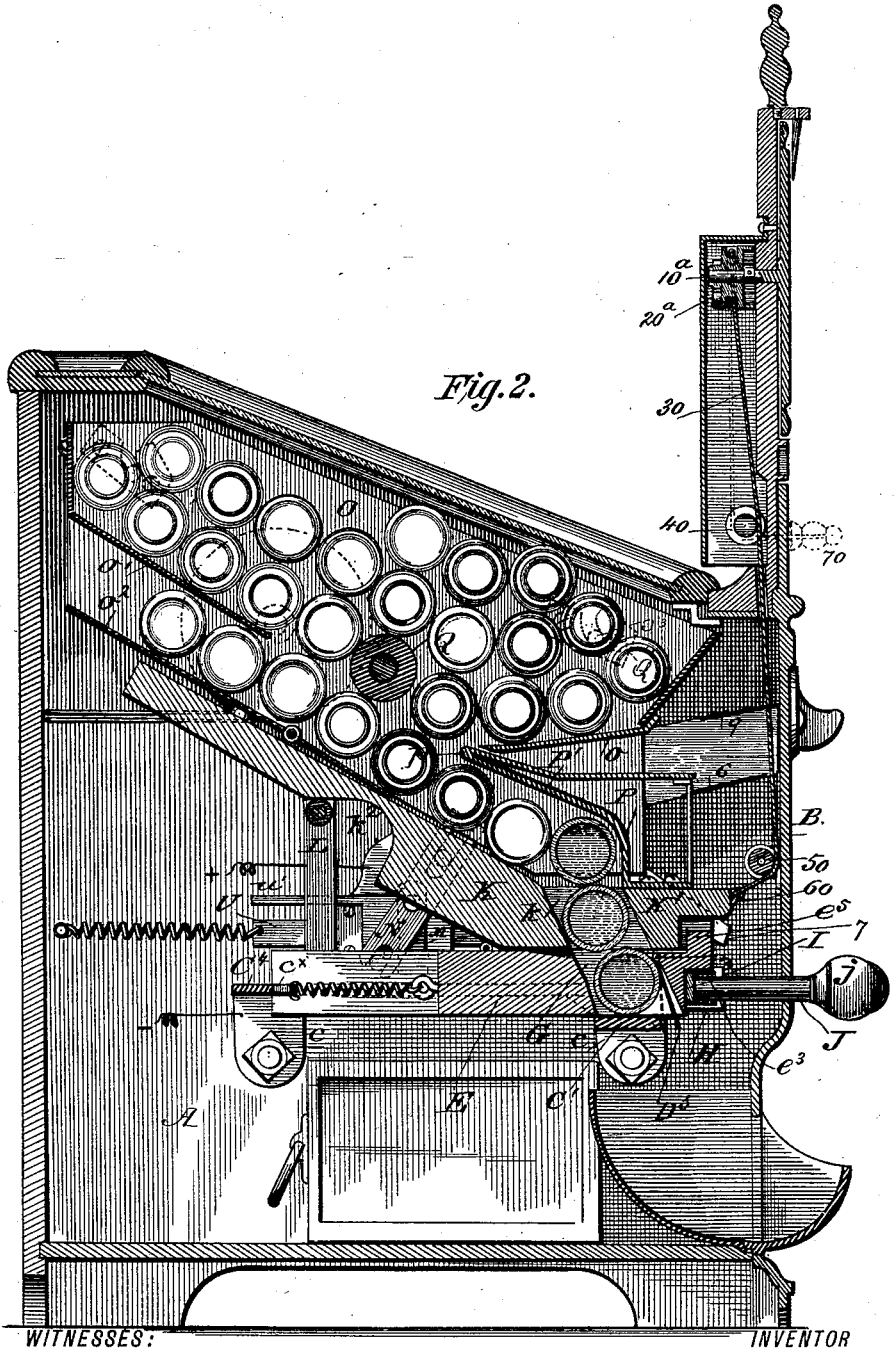
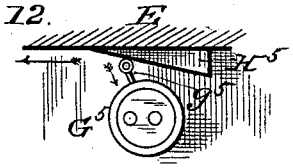
WITNESSES:  INVENTOR
M. Blondel  Fred G. Dieterich
Jos. A. Ryan (No Model.) 4 Sheets—Sheet 3.
F. G. DIETERICH.
VENDING MACHINE.

No. 452,635. Patented May 19, 1891.

WITNESSES: W. D. Blondel, Jos. A. Ryan

INVENTOR Fred G. Dieterich (No Model.) 4 Sheets—Sheet 4.
F. G. DIETERICH.
VENDING MACHINE.
No. 452,635. Patented May 19, 1891.
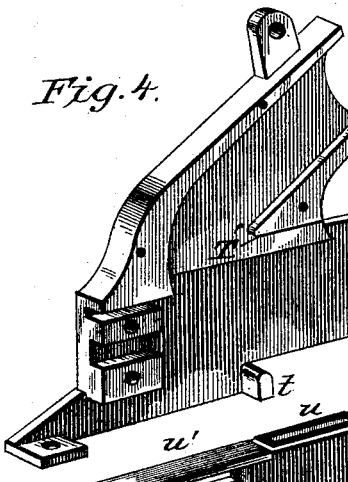
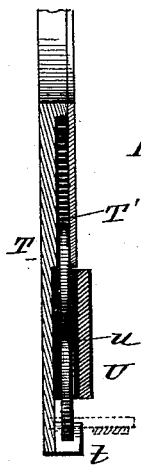
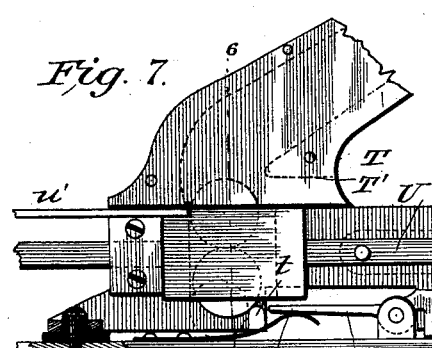
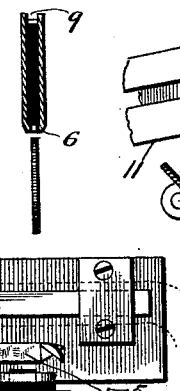
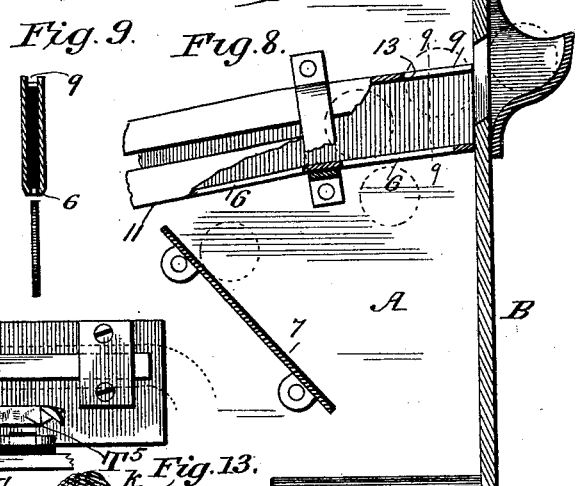
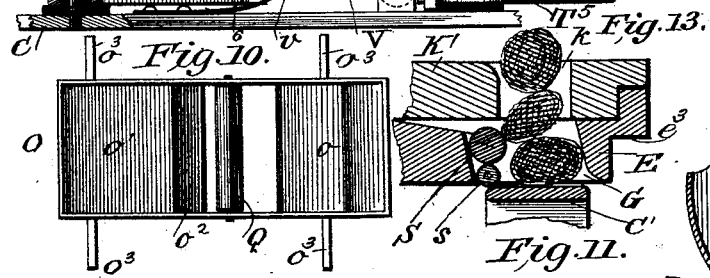
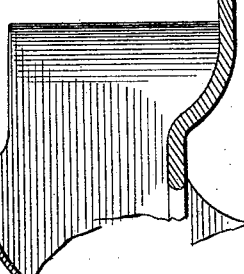
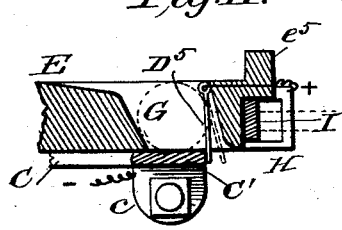
WITNESSES:
W. D. Blondel
Jos. A. Ryan
INVENTOR:
Fred G. Dieterich

UNITED STATES PATENT OFFICE.

FRED G. DIETERICH, OF WASHINGTON, DISTRICT OF COLUMBIA, ASSIGNOR TO JOHN U. O'MEARA, OF SAME PLACE.

VENDING-MACHINE.

SPECIFICATION forming part of Letters Patent No. 452,635, dated May 19, 1891.

Application filed December 9, 1890. Serial No. 374,066. (No model.)

*To all whom it may concern:*

Be it known that I, FRED G. DIETERICH, a citizen of the United States, residing at Washington, in the District of Columbia, have invented certain new and useful Improvements in Vending-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention, which is in the nature of a coin-operated vending-machine and which relates more particularly to improvements on the machine for which patents were granted to me March 11, 1890, Nos. 423,033 and 423,034; April 22, 1890, No. 425,996; August 12, 1890, No. 434,127, and October 21, 1890, No. 439,030, has for its object to provide certain novel details of mechanism which will render the machine more attractive and useful in connection with electrically-operated devices which are set in operation only after the insertion of the proper coin or coins.

It has also for its object to provide an automatic (electrically-operated) "tell-tale" device which will operate to ring an alarm-gong within the machine should the machine at any time refuse to feed out one of the articles being sold, as also to notify the attendant or owner that the goods-receptacle or feed-box is empty after the last article in the machine has been sold.

A further object of my invention is to provide a coin-chute and connections between such chute and the goods-delivery trough whereby any coin of a less thickness than the proper coin will be discharged into the delivery-trough and practically returned to the purchaser, the said coin-chute being also so constructed that a coin or a piece of metal of the same thickness but of a less diameter than the proper coin will pass by the coin-holding mechanism into the money receptacle or box in the machine.

To this end my invention consists in the sundry novel arrangements and peculiar construction of parts, all of which will hereinafter be fully described in the specification, and specifically pointed out in the claims, reference being had to the drawings, in which—

Figure 3:
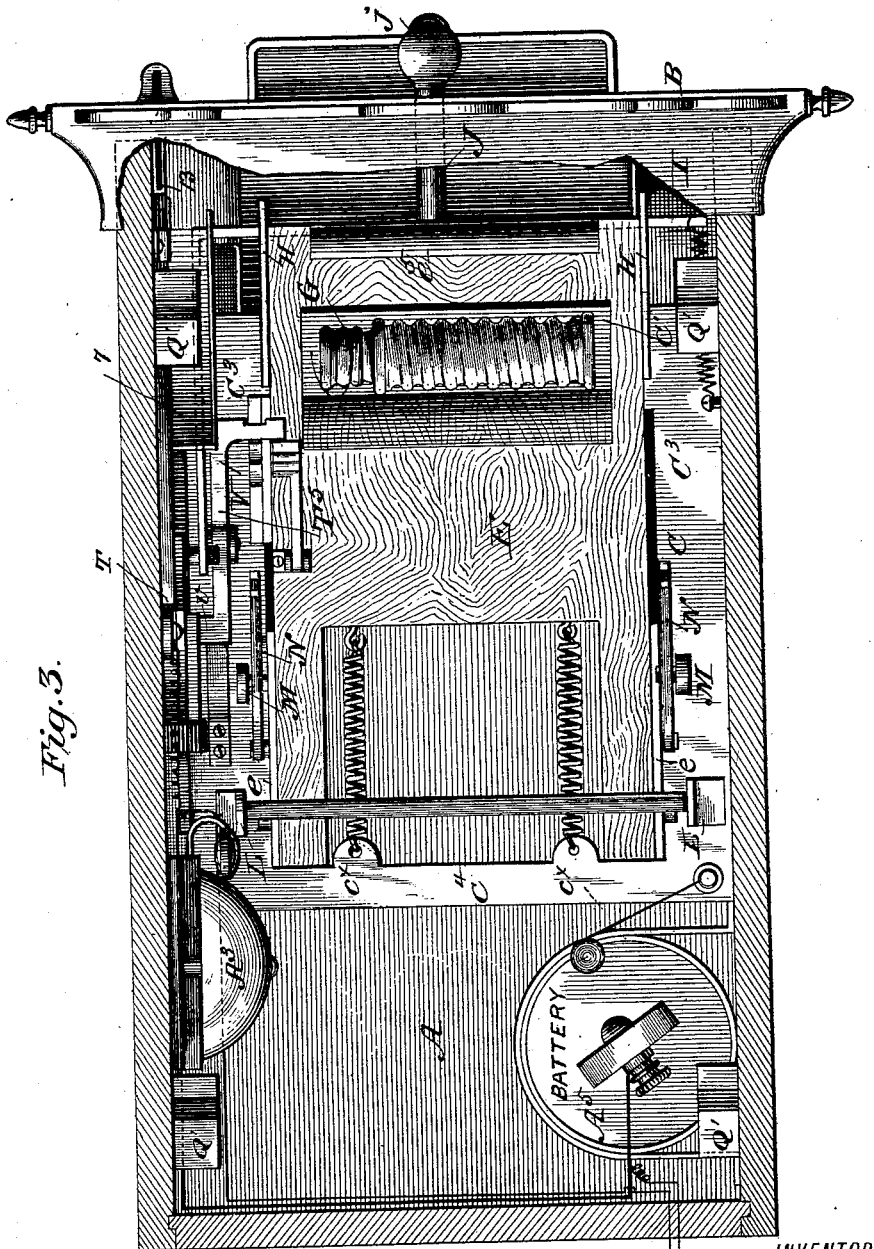

Figure 1 is a perspective view of my improved vending-machine. Fig. 2 is a central longitudinal section of the same. Fig. 3 is a top plan view of the machine, partly in horizontal section, the top and the upper feed-slide and goods-receptacle being removed. Fig. 4 is a detail view of the vertical coin-casting. Fig. 5 is a similar view of the coin-operating bar. Fig. 6 is a vertical section taken on the line 6 6, Fig. 7. Fig. 7 is a detail face view of the coin mechanism and locking-lever. Fig. 8 is a detail view of the upper coin-chute, hereinafter specifically referred to. Fig. 9 is a transverse section taken on the line 9 9, Fig. 8. Fig. 10 is a plan view of the detachable goods holder or support. Fig. 11 is a detail section of the automatic electrically-operated annunciator, hereinafter referred to. Fig. 12 is a detail view illustrating the means for operating the register, and Fig. 13 illustrates the feed-slides especially adapted for the sale of cigars.

In the accompanying drawings, A indicates the casing, of the form shown, which is provided with an ornamental metal front B, as before, such casing and front being of course slightly varied according to the article for the sale of which the machine is constructed.

In the construction shown in Figs. 1, 2, 3, 4, 5, 6, and 7 the machine is especially adapted for selling ten-cent goods, although, as will appear later on, the machine can be readily adapted for five-cent or fifteen-cent goods.

C indicates a metal bracket, which I shall term the "main support" or "brace," as it is, as will be seen in Fig. 3, cast of a single piece and is bolted by its ears *c c* to the sides of case A, serving to hold the sides together and at the same time forming a strong support for the feed mechanism, which is secured to and mounted on said bracket, none of it being secured to the wooden case, thereby providing against the said mechanism bending, &c., owing to any shrinkage in the wood.

In all of my other patents referred to it will be noticed that I employed two slides working in opposite directions, but making an indirect feed—*i. e.*, the purchaser would buy the article which the previous purchaser had in the operation of the machine caused to be fed down into the pocket in the lower or delivery slide, thus making it necessary at the beginning of the operation of the machine to operate the machine twice before it would begin to feed. While this construction has proved very practical in many respects, the adjustment of the opening in the upper slide relative to the goods receptacle or holder required a too careful attention.

In the present construction of feed devices I produce a feed which will be positive and direct, an absolute cut-off against more than one article being drawn out at one operation, and one in which the slides, when once adjusted in position at the factory, are always in position to operate, the attendant having nothing to do with the adjustment thereof, he only being required to place the bottles, boxes, or other articles in the goods-receptacle.

By reference to Fig. 2 of the drawings, which shows the construction of the feed-slides most clearly, it will be seen that the bottles extend down from the box D directly into the feed-slides, the lowermost bottle lying on the transverse bar C' of the support C.

The lowermost or delivery slide E consists of a wooden block formed on its sides with suitable metal guides $e\ e$, which are provided with friction-rollers, which travel on in the inner edges of the longitudinal members $C^2$ $C^3$ of the support C, whereby said slide is held for easy movement on said support, being drawn back to its normal position by means of springs E' E', which connect its rear end with the ears $c^\times\ c^\times$ of the cross-piece $C^4$ of the said support.

In the forward end of the slide E is an opening G, which forms a pocket, as such opening is normally over the cross-bar C', the size of such opening being governed by the article for the sale of which the machine is adjusted, such opening, however, being always, when selling articles of uniform size, slightly larger than such articles. When, however, the machine is adjusted to sell cigars, the sizes of which are always varied in diameter, the said opening is made much larger and supplied with rollers S and $s$, journaled transversely across the rear wall of said pocket, the function of which rollers will hereinafter be fully explained in the description of the construction shown in Fig. 13 of the drawings. The front wall of the slide E is recessed, as at $e^3$, and upon the outer edges slotted castings H are secured, such castings forming guides in which the transverse operating-bar I has a limited play forward, its rearward movement being limited by the front wall of slide E. These castings H do not, however, contact with the support C.

J denotes the operating pull-bar, which connects at its inner end with the cross-bar I, while its outer end projects out through the front plate B and is formed with an ornamental pull-knob or finger-piece $j$, as shown.

K indicates the upper feed-slide, which in this case is also arranged diagonally to the lower slide, having, however, a horizontal portion K' at its lower end, which rests upon and travels on the lower slide, being limited in its forward movement by the nose-piece $e^5$ on the lower slide, as shown. The portion K' of the slide is formed with a feed-opening $k$, which normally registers with the opening G in the lower slide, forming, as it were, in connection with said opening, a vertical chute at the lower end of the incline of the upper feed-slide, which chute is of a size sufficiently large to allow for two goods vials or boxes to rest one on top of the other, as shown.

The rear end of the slide K is supported on a transverse roller or bar journaled on the standards L L, secured to the supporting-bracket C, said slide being formed with a cut-away portion $k^2$ to allow the lower end of such slide, when reciprocated in a manner presently described, to move back horizontally over the lower slide E.

M M indicate the link-standards, cast integral with the base or support C, and N N the swinging links which connect the upper and lower slides. By this arrangement of the slides it will be observed that a direct cut-off is obtained when the machine is operated. Thus when the handle J, after having been released by the coin or coins, is pulled out, the lower slide will travel directly forward and discharge the lowest vial or box into the trough below it, while the upper slide will travel in a reverse direction, carrying the second article backward onto the solid portion of the lower slide, thereby placing the second article the farthest away from the discharge-opening in the lowest slide at the moment the first article is discharged, thereby absolutely avoiding the possibility of obtaining two packages or articles at one operation of the machine, and at the same time producing a positive delivery of the goods so long as they feed down to the discharge-openings.

As some articles which are sold through my improved machine are of some weight—as, for instance, glass bottles containing liquids or solids—I find it desirable to relieve the upper slide of as much of the weight as possible, so as to reduce the power to be applied to the pull-bar J and otherwise reduce friction. To this end I provide a metallic goods-receptacle O, formed with an open top and partly-closed front and rear ends, the front end being formed with a deflector or inward and downward incline $o$ and the rear end with an inclined false bottom $o'$, which extends some distance inward and over the bottom plate $o^2$, such plate extending about half-way under the rear end of the receptacle.

By referring to Fig. 2 of the drawings it will be seen that the space between the false bottom and the bottom plate is such as to allow for the movement of but one tier of bottles, and that the front deflector-plate is also so arranged that but one row or tier can run down the incline at a time. It will also be observed that to the front upper edge of the opening in the upper slide a stop-plate P is formed, which may, if desired, be simply a transverse strip arranged so that it can travel with the slide under the deflector. In the drawings, however, I have shown it constructed with an upwardly-extending portion P', which extends to a point just in advance of the deflector o. This device I term the "goods-agitator," as I have found it a practical means of preventing bridging of the articles being sold, as it frequently happens that the articles will so adjust themselves (especially when cigars are sold) as to form a complete bridge over the point where they should feed down the incline of the upper slide. By means of this device, which is made fast to the upper slide to reciprocate therewith, it will be seen that as said slide moves back the nose $p$ of the agitator will push in between the articles, generally between the first and second tiers, and cause them not only to separate, but temporarily lift the weight of the goods at the feed-point from the lower row of articles, said nose $p$ drawing back under the deflector-plate o as the slides come to normal positions.

While the construction of the agitator shown is preferable, I do not desire to confine myself to such form, as a transverse bar may be located at the point where the nose $p$ operates, which might be caused to reciprocate by connection with the upper end of the swinging link or with the upper slide.

To further prevent bridging and to hold the weight from the upper slide, I provide a transverse roller Q over the point where the articles are fed to the incline. The receptacle O is supported on the sides of the casing by means of its lateral arms $o^3$ $o^3$, resting in the brackets Q' Q', the lower edge of such receptacle being above the upper slide.

By means of the aforesaid construction it will be observed that when the slides are operated the upper slide will, through its agitator, move the lower tier of articles upward, causing the upper ones of such tier to move up under the false bottom $o^2$, thus furthermore stirring the articles and insuring a proper feed and cut-off.

Anything in the nature of novelty connected with these machines enhances their value, as it attracts the crowds to the machine and tempts them to buy. I therefore use in connection with the machine a wheel of fortune, which in the general arrangement is similar to the one shown in my patent, No. 434,127, above referred to. In this case, however, I arrange it upon a vertical standard connected to the top of the front in any desirable manner, the spindle $10^a$ of which passes through the standard and connects with a spring-actuated pawl-and-ratchet mechanism $20^a$, which is operated by a cord or chain 30, which extends over a guide-pulley 40, down through the top of the machine to the rear of a guide-pulley 50, and connects with the forward end of the upper slide, as at 60. By this construction it will be seen that when the machine is operated the upper slide will draw on the pawl-and-ratchet devices and cause the wheel to spin, which when it comes to a stand will, for example, indicate the nationality of the buyer, and the wheel sometimes stopping at the space which indicates a "jackass," will cause the laugh to be on the buyer turning to this object, thereby creating a great deal of amusement and the desire to spin again.

If desired, the wheel may be operated separately by means of a pull-knob 70, as shown in Fig. 1; but by connecting it with the feed-slides, as stated, necessitates the insertion of the coin or coins before it can be spun.

In connection with the oppositely-movable feed-slides I would state that when they are used to sell articles which have irregular bodies, such as cigars, I provide an additional means for causing the upper cigar to move rearward as the lower cigar is discharged.

It is clear to those acquainted with cigar-selling machines that sometimes two cigars when they fall sidewise (their narrow edges down) will almost fit into the space of one cigar with its broad side down. To overcome the danger of breakage and choking when they fall this way, I provide a roller S at the rear end of the opening in the lower slide and make the rear wall thereof slightly inclined upward, the space between the roller and the front wall of the opening being of a size a little larger than the largest ordinary cigar sold. This roller I arrange so that when the slide is pulled forward it (the roller) will revolve backward in a direction reverse to the movement of the slide. This is accomplished by means of a smaller roller $s$, which bears against the roller S and against the transverse bar C'. Thus when pulled over said bar it will by friction cause the larger roller to revolve rearward, as stated.

It is obvious that any other means may be employed for turning the roller S in direction opposite the movement of the lower slide—as, for instance, a rack and cog or other similar device.

By reference to Fig. 13, which illustrates one of the possible positions which a large and a smaller cigar may assume, it will be observed that the upper edge of the smaller or uppermost cigar is almost too low down for the upper slide to engage it. Now when in this position the lower slide is pulled forward, the roller S in turning will roll the small cigar up on top of the larger cigar before it is discharged, put it in position for the upper slide to engage it, and carry it back up the incline of the slide, thereby effectually feeding the cigars irrespective of the diameters and the positions they might assume at the feed-discharge openings.

By referring to Sheet 4 of the drawings, which discloses most clearly the coin mechanism, it will be observed that I now also provide means for getting rid of a coin or dummy of a less thickness than the proper coin at the upper end of the coin-chute and cause such coins to drop down into the trough so they can be recovered.

By referring to Figs. 8 and 9 it will be seen that I form the lower wall 11 of the chute 5 with slits 6 6, which are of a slightly-less width than the thickness of a nickel, thus allowing a penny or a dime to fall through onto a deflector 7 into the trough, as stated.

I am aware that this construction so far as described is not new. I have also found from practical experience that it is not sufficient to prevent "beating," as dishonest persons will take a thin dummy of the size of a nickel, hold it at the coin-slot, give it a quick movement, and shoot it over the slits 6 6 down into the coin mechanism. To provide against this, I arrange the mouth of the chute so that its upper edge 9 is about midway the coin-slot 12, and I form the edge 9 open a short distance back, as at 13. Now when a person holds a coin and forces it quickly into the slot 12 it will strike the edge 13 and drop down through the slits 6 6 and into the trough.

In all of my other patents the forward end of the locking-lever forms one of the points upon which the nickel is caught and held. This I have found requires a careful adjustment of the tripper, and also prevents the possibility of making an electric circuit through the coin, in the manner which will presently be explained.

In the present case I cast a lug $t$ on the vertical coin part T, which in its general construction is the same as disclosed in Patent No. 439,030.

U indicates the coin-operating pull-bar, which is formed with a pocket portion U', arranged to embrace a plurality of coins, such pocket being provided with an insulated lining $u$, as most clearly shown in Fig. 4 of the drawings, said pocket being formed with a rearwardly-extending member $u'$, which operates under the discharge-mouth of the coin-chute and serves as a cut-off to hold any other coins which may be in the chute, as the lower two are drawn away by the forward movement of the bar U.

By reference to Fig. 7 of the drawings it will be observed that the coin part T is insulated from the bracket or support C', and that the end of the locking-lever V, which is pivoted on the bracket, is also disconnected from the said part. It will also be observed that when the two proper coins have been dropped into the slot the lowermost coin will engage the lower edge of the rear wall of the pocket and the lug $t$, said coin being held thereby from passing down farther, the relation of the edge and lug being such, however, that should a coin or dummy of the same thickness but of a less diameter than the proper coin be put in the slot it would pass down between the lug and pocket into the coin-box below, this construction and arrangement of parts, in connection with the peculiar arrangement of the upper end of the coin-chute, providing against any possibility of a coin or dummy as thick but not of the same diameter, or a coin or dummy of the same diameter but less thickness, operating the machine.

$A^5$ indicates a battery, one pole of which is connected with the upper coin part T, while the other pole is connected with the bracket, an electric alarm-bell being connected with the normally-open circuit.

By arranging the coin parts as before stated and insulating them from each other it will be observed that when the two lower coins are pulled forward the lowermost coin will engage the tripper $T^5$, while the upper coin will engage the abutment T', thereby closing the electrical circuit and causing the alarm-bell $A^3$ to ring so long as the coins remain on the end $v$ of the lever V.

When a double-coin machine is used, it is essential, when the first coin is put in, that when the bar is pulled slightly (it having normally a slight movement outward) the coin does not make the connection. This is accomplished by the insulated lining in the pocket, thus preventing a dishonest person deceiving the attendant in the fact that he dropped in two coins and the machine would not work. When, however, the second coin is put in, its edge will project above the pocket (see Fig. 7) and form the circuit, as before stated, it being obvious that where a single-coin machine is used the insulated pocket is dispensed with and the parts so arranged that the first coin will make the circuit. As a further means of increasing the novelty of the machine, I provide a separate circuit $B^5$, which is connected with the bell-circuit, a switch $B^6$ being provided, which is arranged in convenient reach of the attendant, so that he can at his pleasure cause the bell to ring to draw a crowd to the machine. A still further novel but very essential part of my invention is the automatic alarm or indicator, which not only causes the bell to ring when the machine is empty, but also rings the bell in case the machine fails to feed while articles are yet contained in the hopper or receptacle.

I am aware that, broadly, it is not new to have an automatic device which will give out a sign when the machine is empty; but by my device the alarm is rung at any time during the selling of the contents of the machine, in case by any possible means the goods refuse to feed out of the discharge-slides. To this end I employ the construction most clearly shown in Figs. 2 and 11 of the drawings, by reference to which it will be seen that on the front wall of opening in the lower slide I arrange a gravity contact-maker $D^5$, which is so hung that its weight will normally swing it against the bracket or support C', which is connected with one pole of the battery and the bell-circuit, while the contact-maker $D^5$ at its upper end is connected with the cross-bar I, which is in connection with the other pole of the bell-circuit.

In Fig. 2 the lower bottle bears against the contact $D^5$ and holds it from the bracket-support B. Now should the next bottle fail to fall into the lower pocket as the slides come to normal position, the contact $D^5$ would swing against the bracket C' and close the circuit and continuously ring the bell until the attendant, by slightly jarring the box, causes the next bottle to drop, which would then automatically press the contact $D^5$ out and break the circuit. This automatic alarm also prevents the public at any time being "beat" by the machine, as they soon would know that a continuous ringing of the bell indicates "machine out of order."

$G^5$ indicates a register of any well-known construction, preferably of the class known as "hand-registers," where the thumb or finger is used to press the lever $g^5$ down. This lever is operated by means of a cam-plate $H^5$ on the bottom of the lower slide, (see Fig. 12,) which plate when the slide is drawn out presses the lever down and causes it to register.

Having thus described my invention, what I claim, and desire to secure by Letters Patent, is—

1. In a vending-machine, a delivery mechanism consisting of two slides formed with registering feed-apertures, said slides arranged relatively, whereby when the lowermost slide is operated to discharge the lowermost article the upper slide will move in a reverse direction and force the next article away from the opening in the lower slide and back into said opening on the reverse movements of the said slides, substantially as and for the purpose described.

2. The combination, with a horizontally-movable delivery-slide having a pocket adapted to hold the lowermost article to be sold, of a fixed restraining-plate forming normally the bottom of such pocket, a second slide formed with an opening or pocket adapted to hold the second article over the first article, and means for reciprocating said slides in reverse directions, whereby to move the lowermost article outward and discharge it from the restraining-plate and the second article rearward away from the pocket in the lower plate and then back again into the said pocket, substantially as and for the purpose described.

3. In a vending-machine, the combination, with a horizontally-movable delivery-slide formed with an opening arranged to hold the lowermost one of the articles being vended, and the goods-receptacle held above said slide, of a horizontally-movable slide arranged intermediate the delivery-slide and the goods-receptacle, said slide formed with a feed-aperture normally in communication with the aperture in the delivery-slide and with the goods-receptacle, said slide arranged to move in reverse directions to the delivery-slide and cut off the second article from the delivery-opening as the first article is being discharged, substantially as shown and described.

4. In a vending-machine, a delivery mechanism consisting of two horizontally-disposed slides arranged one on top of the other, each formed with coincident apertures or pockets normally in communication with the goods-receptacle, the lower slide adapted to hold the lowermost article in its pocket or aperture, the upper slide the next succeeding article, and connections between such slides whereby they will move in reverse directions when operated, and whereby the upper slide will serve to shove the second article onto the solid portion of the lower slide as the lower article is being discharged, substantially as and for the purpose described.

5. The combination, with the supporting-bracket C, formed with a transverse member C', of a horizontal delivery-slide having a discharge-opening normally disposed over said member C', whereby a pocket is formed, a roller journaled transversely in the rear wall of the said discharge-opening, arranged to revolve in a reverse direction to the movement of the delivery-slide, a second slide operating on the delivery-slide, having a feed-opening normally in communication with said pocket, and means for moving said slides in reverse directions when operated, all arranged as and for the purpose described.

6. In a vending-machine, the combination, with the delivery-slide E, formed with a discharge-opening and the bottomless goods-receptacle O disposed above it, of the feed-slide K, arranged intermediate the delivery-slide and the goods-receptacle, forming the bottom thereof, said slide K formed of a horizontal member arranged to move on the delivery-slide and provided with a feed-opening communicating with the goods-receptacle and the discharge-opening in the delivery-slide, an upwardly-inclined portion, and means for reciprocating slides E and K in reverse directions, as and for the purpose described.

7. The combination, with the delivery-slides, of the goods-receptacle held over the upper one of such slides, said receptacle formed at its discharge end with a deflector O, arranged over the discharge-opening in upper slide, whereby a feed-channel is formed between it and the said upper slide, an agitating device arranged to reciprocate in said feed-channel to project beyond said deflector into the goods-receptacle as the slides are operated, and means for operating said slides and agitator, substantially as and for the purpose described.

8. In a vending-machine, the combination, with a bottomless goods-holding receptacle supported within the casing, of the oppositely-movable delivery-slides, the upper one of such slides forming the bottom of the goods-receptacle, an agitating device secured to the said upper slide adapted to operate in the goods-receptacle between the articles and prevent bridging, said agitator arranged to reciprocate with the upper slide, substantially as and for the purpose described.

9. The combination, with the bottomless goods-receptacle, of the delivery-slides E K, the upper slide K formed with an agitating device, said device extended forward beyond the feed-opening in the upper slide and downward and secured to the front end of said slide K, forming a stop, whereby the articles will be held from passing beyond the feed-opening in the slide K, substantially as and for the purpose described.

10. The combination, with the delivery-slides arranged as shown and described, of the goods-receptacle O, supported above said slides, provided with partial supporting-walls near its bottom, whereby the major part of the weight of the articles will be held from the upper slide, substantially as and for the purpose described.

11. The combination, with the delivery-slides E K, the upper slide K formed with a transverse wall in front of its feed-opening, of the goods-receptacle O, disposed above the said slide and formed with a deflector at its forward end and a false bottom o at its rear end, all arranged substantially as and for the purpose described.

12. The combination, with the delivery-slides, of a revolving disk or wheel mounted on the outside of the casing, a spring-actuated pawl-and-ratchet mechanism for revolving said disk or wheel, and a cord connection between said ratchet mechanism and the delivery mechanism, whereby said ratchet and pawl are operated to spin the wheel as the delivery-slides are operated, substantially as and for the purpose stated.

13. The combination, with the coin-slot in the casing, of a coin-chute connected with said slot, said chute formed with one or more slots in its lower wall of a size slightly narrower than the thickness of the proper coin, and with a cut-away portion at the upper end of its upper wall of a width greater than the thickness of the proper coin, said cut-away portion arranged approximately midway of the said coin-slot, substantially as and for the purpose described.

14. In a vending-machine, a coin-chute formed at its base with a fixed projection, in combination with the coin-operating devices, such fixed projection arranged relatively to such devices, whereby a coin or dummy of less diameter than the proper coin will pass by such projection, substantially as and for the purposes described.

15. In a vending-machine, a coin-chute formed with discharging-apertures at its upper end, whereby a coin or dummy of the same diameter but of less thickness than the proper coin will fall therethrough, and a restraining or fixed coin-holding device at its lower end arranged to hold the proper coin in place, but allow of the passage of a coin or dummy of a less diameter than the proper coin, substantially as and for the purposes described.

16. The combination, with a coin-chute formed with a fixed projection adapted to arrest and hold the coin, the delivery-mechanism locking-lever, and an abutment above such lever, of an operating slide-bar disposed between the lever and abutment, said bar arranged when operated to pull the coin from the said projection onto said lever and against the abutment, substantially as and for the purpose described.

17. The combination, with the delivery-mechanism locking-lever V, of the coin part T, an open electrical circuit provided with an alarm, said lever and coin-chute forming the terminals of such circuit, said coin part T formed with a fixed projection $t$ and an abutment, and the slide-bar U, operating on said coin part, formed with a pocket adapted to embrace the coin and when operated to move the coin onto the lever V and against the abutment, and thereby close the circuit and ring the alarm, substantially as and for the purpose described.

18. The combination, with the locking-lever V, of the support or bracket C, the coin-operating mechanism mounted on said bracket, but insulated therefrom, a battery, a main electrical alarm-circuit, the coin mechanism and lever V forming the terminals thereof, and a supplemental open circuit connected with the main circuit and extended to the outside of the machine and provided with switch, all arranged substantially as described, whereby the alarm will be rung when the machine is operated or when the supplemental circuit is closed, as set forth.

19. The combination, with coin part T, formed with a lateral coin-restraining projection $t$ and an abutment, the locking-lever V, an open electrical circuit provided with an alarm, said lever V and coin part T forming the terminals of said circuit, of the operating slide-bar U, formed with an insulated pocket, the lower rear edge of such pocket and the lug $t$ arranged to hold the proper coin in position, such pocket adapted to receive a plurality of coins and move same between the lever and the abutment and close the circuit, substantially as and for the purpose described.

20. In a vending-machine, the combination, with the delivery-mechanism locking-lever and an open electrical alarm-circuit, said lever forming one terminal of such circuit, of a coin mechanism forming the other terminal, said mechanism arranged relatively to the locking-lever, whereby a plurality of coins are necessary to be operated by said mechanism to operate the lever and close the electrical circuit and ring the alarm, substantially as and for the purposes described.

21. In a vending-machine, the combination, with the delivery and feed mechanism, of an electrically-controlled alarm normally held from operation by the articles being sold as they automatically feed to the delivery-slide and set in operation by failure of said articles feeding to the proper position on the delivery-slides, as and for the purposes stated.

22. The combination, with the delivery and feed mechanism and the articles being sold, of an electrically-operated alarm-circuit, an automatic switch in such circuit normally held open by the articles as they feed in position, said switch arranged to automatically close said circuit when such articles fail to feed in place or the goods-receptacle becomes empty, substantially as and for the purpose described.

23. The combination, with the feed and discharging slides and the articles held thereby, of an electric alarm-circuit, an automatic switch disposed at the feed-openings in said delivery-slides and normally held open by the pressure of one of said articles against it, said switch adapted to close the circuit when pressure of the articles is removed therefrom and the said feed and delivery slides resume their normal position, substantially as and for the purpose described.

24. The combination, with the delivery and feed mechanism, of an electrical alarm-circuit, a gravity-switch arranged to connect the terminals of said circuit, said gravity-switch disposed at the discharge-opening of the delivery-slide and normally held in open position when the articles are in the machine and properly fed into position, but to drop by gravity and close the said circuit when pressure of such articles is removed therefrom, substantially as and for the purpose described.

25. In a vending-machine, the combination of the following parts: a coin-operating mechanism, a delivery mechanism, coin-operated locking-lever, an electric supply, a main electrical alarm-circuit connected with such supply, said coin mechanism and lever forming the terminals of said main circuit, a supplemental circuit connected to the main circuit extended outside the machine and provided with a switch, and an automatic electrically-operated device connected with the main circuit and arranged to be held from operation by the articles as they are discharged, and arranged to operate the alarm when such articles fail to feed to the discharge-slide or when the machine becomes empty, all arranged substantially as and for the purpose described.

In testimony whereof I affix my signature in presence of two witnesses.

FRED G. DIETERICH.

Witnesses:
 ALEX. S. STEUART,
 M. D. BLONDEL.